Oct. 23, 1956

R. WAGNER ET AL 2,768,340

DATA TRANSMISSION SYNCHRO SYSTEM

Filed May 20, 1953

INVENTORS
Carlton B. Goss
Robert B. Wagner
Samuel L. Fagin
BY Scrivener and Parker
ATTORNEY 2,768,340
Patented Oct. 23, 1956

1

2,768,340

DATA TRANSMISSION SYNCHRO SYSTEM

Robert Wagner, District Heights, and Samuel L. Fagin, Hyattsville, Md., and Carlton B. Goss, Fort Wayne, Ind., assignors, by mesne assignments, to ACF Industries, Incorporated, a corporation of New Jersey Application May 20, 1953, Serial No. 356,246
8 Claims. (Cl. 318—30)

Figure 1:
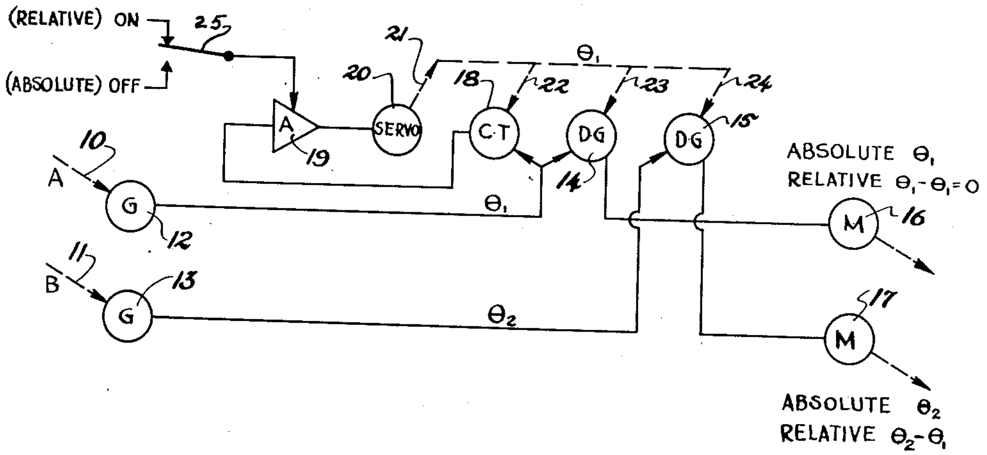

This invention relates to data transmission systems and more particularly to a novel data transmission system for producing a plurality of output values representing the relation of a plurality of input values to either a fixed value or to any selected one of the input values.

Though it has many other purposes, the invention is particularly useful for indicating the motion of a plurality of movable objects with reference to one of the objects which may itself be moving. In order to achieve this effect, the reference object, though actually moving, must appear stationary, and the movement of the other objects with respect thereto must be accelerated or retarded in order that their speed or degree of movement will actually represent the relative speed or degree of movement between the reference and other objects. Such an arrangement may be useful in a tracking or plotting device where the movement of a large number of objects or targets may be represented by the positioning of pens.

In such a device, it may be desirable to have the tracks plotted with respect to some stationary point, as for example, a fixed plotting station, in which case each plot would represent the movement of an object without regard to the movements of the other objects. On the other hand, it may be convenient to use any one of the moving objects as a reference object and observe the movement of all the other objects with respect thereto. In this case, the pen representing the track of the selected object must remain stationary whereas the pens representing the tracks of all the other objects must receive a component of motion representing the movement of the reference object so that the tracks represent the relative movements between the reference and all the other objects. This type of motion representation may be referred to as "relative" and, the former type described above may be referred to as "absolute" motion representation.

This invention provides novel means for achieving such an effect and includes therein means for quickly and simply selecting any one of a plurality of moving objects or a stationary object as a reference to which the movement of all the other objects may be related. It should be understood that this invention is not confined to the relating of movement of objects but is equally well adapted to relating values which may be representative of any of a number of variable quantities where it may be desired to observe one of the values with respect to a number of other values.

This invention broadly comprises provisions for each of a plurality of input values, a set of components comprising a transmitting unit, a differential device, and a receiving unit. In order to relate each of the plurality of inputs to any selected one thereof, we actuate all of the differentials of the system simultaneously and to the same degree as the transmitting unit of the selected value. This results in zero output from the receiving unit of the selected value and an output from each of the other receiving units equal in value to its own input minus the selected transmitter unit value. Though a wide variety of electric or mechanical elements may be utilized we have found an arrangement of conventional self-synchronous motor units preferable, but it should be understood that other means for producing the same results are intended to be included within the purview of the invention.

2

Hence, one object of the present invention is to provide a data transmission system for relating the values of a plurality of variable quantities to the value of one of them or to a fixed value.

Another object of the invention is to provide in a data transmission system for accomplishing the above purpose, means for rapidly selecting any one of the variable values to which the other variable values are to be related.

Still another object of the invention is to provide a data transmission system which may be utilized for relating the movement of a plurality of movable objects to the movement of one of them or to a stationary point.

Still another object of the invention is to provide a data transmission system comprising a novel arrangement of self-synchronous motor units for accomplishing the above stated objects.

Another object of the invention is to provide a self-synchronous control system arranged as a value relating device which is simple in construction, easy to operate, and productive of highly accurate results.

Yet another object of the invention is to provide a self-synchronous system of the above type which may be readily applied to well known multispeed self-synchronous transmitting systems utilizing a plurality of speed to achieve high accuracy transmission of a desired quantity.

Figure 2:
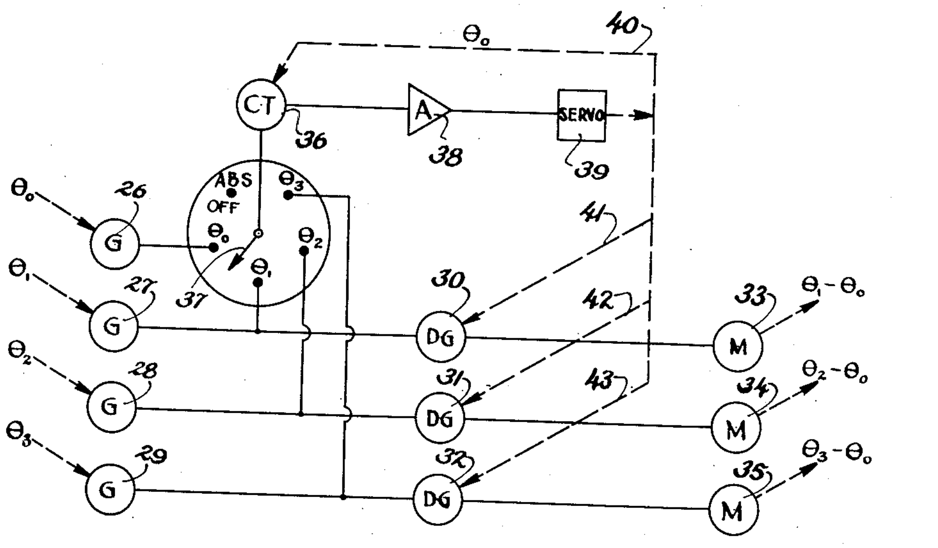

Other objects and their attendant advantages will become apparent as the following detailed description is read in conjunction with the accompanying drawings wherein:

Fig. 1 is a schematic block diagram of a self-synchronous system constructed in accordance with this invention; and Fig. 2 is a schematic block diagram of another arrangement of a self-synchronous system constructed in accordance with this invention.

Referring now to Fig. 1 of the drawings, A and B designate movable objects whose degree or rate of movement is imparted through suitable mechanism represented by the lines 10 and 11 to the rotors of conventional self-synchronous generators 12 and 13 which are of the type whose rotors are energized from a suitable electrical source to induce in polyphase stator windings a voltage which may be transmitted to remote connected windings of self-synchronous units which, in the embodiment illustrated, are the respective stator windings of conventional differential generators 14 and 15 whose rotor windings in turn are connected to the respective stator windings of conventional self-synchronous motors 16 and 17 which are similar in construction to the self-synchronous generators 12 and 13.

It should be understood that in lieu of the motors 16 and 17, suitable self-synchronous control transformers or other devices responsive to the signals transmitted by the self-synchronous generators 12 and 13 could be utilized.

The differential generator units 14 and 15 are of the usual type having similarly constructed poly-phase rotor and stator windings, which, when aligned in the electrical zero position, pass through their voltage inputs without alteration thereof so that the effect on a self-synchronous system connected as above-described is the same as if the transmitter and receiver were directly connected without the interposition of the differential generator, that is to say, with the rotor and stator windings so aligned, when the rotors of self-synchronous generator 12 and 13 are moved to angular position of $\theta_1$ and $\theta_2$ respectively, these are repeated by the rotors of the corresponding self-synchronous motors 16 and 17 thereby producing "absolute" representation of the values assigned to $\theta_1$ and $\theta_2$ which, for purposes of illustration, may be assumed to be the respective motions of objects A and B.

Now if it should be desired to observe the motion of B relative to the motion of A the motion representation must be such that A appears stationary while B moves with respect thereto; i. e., B's true motion with respect to a fixed point must be altered by a component of motion which is the motion of A relative to B. This invention includes means for effecting this result and this means will now be described.

It is well known that in a self-synchronous system comprising a transmitter, a differential generator, and a receiver connected as hereinbefore described, movement of the rotor of the differential generator produces rotor movement in the receiver which is equal to the position of the rotor of the transmitter minus the position of the rotor of the differential generator. Thus if the rotor of self-synchronous generator 12 were moved to a position $\theta_1$ and the rotor of the differential generator is also moved to a position $\theta_1$, following the above rule and subtracting the differential-generator rotor position from the self-synchronous generator rotor position the result is obviously zero and the rotor of the self-synchronous motor 16 therefore remains stationary. Now, if the rotor of the second self-synchronous generator 13 is moved to a position $\theta_2$ and the rotor of differential generator 15 is moved to the position $\theta_1$, it follows that the rotor of the second self-synchronous motor 17 moves to a position of $\theta_1$ minus $\theta_1$ which, if $\theta_2$ and $\theta_1$ are representative of the motions of A and B, will be a representation of the relative motion of B with respect to A.

It should now be apparent that if the rotors of differential generators 14 and 15 are moved simultaneously with and to the same degree as the rotor of self-synchronous generator 12, the rotor of self-synchronous motor 16 will always remain stationary whereas the rotor of self-synchronous motor 17 will always assume a position representing the difference between the positions of the respective rotors of self-synchronous generators 12 and 13.

Any suitable means may be utilized for accomplishing this simultaneous rotation, one such means being shown in Fig. 1 wherein a conventional servo system comprising amplifier 19 and servomotor 20 is operated in response to control voltage imparted by a conventional control transformer 18 having the usual polyphase stator windings which are connected in parallel with the stator windings of the differential generator 14 to the stator windings of the self-synchronous generator 12. The control transformer 18 has the usual externally movable rotor winding whose voltage output is zero when in the same angular position as the rotor of the self-synchronous generator 12.

Servo-motor 20, through suitable drive mechanism indicated by line 21, operates drive mechanism, indicated by lines 22, 23 and 24 to rotate the respective rotors of the control transformer 18 and the differential generators 14 and 15 in one to one relationship with the rotor of the self-synchronous generator 12. Thus when the latter is turned to a position $\theta_1$, control voltage is transmitted to the servo system causing motor 20 thereof to move the aforementioned rotors until a position is reached at which the control voltage is zero whereupon the servomotor 20 becomes de-energized and all of the rotors are brought to rest at an angular position $\theta_1$. As previously explained, this results in zero movement of the rotor of self-synchronous motor 16 and a movement of the rotor of self-synchronous motor 17 which is equal to the difference between the angular positions of the rotors of self-synchronous generators 13 and 12, and, assuming each of these positions represents the motion of objects A and B, there is reproduced by motors 16 and 17 a true representation of the movement of B relative to A.

In order to change the above described system from a relative to an obsolute motion representing system a switch 25 is provided movable between "on" and "off" positions to render amplifier 19 conducting or non-conducting depending on the desires of an operator. With the switch in the "off" position servomotor 20 is inoperative irrespective of the output of control transformer 18 and thus the separate movements of the rotors of self-synchronous generators 12 and 13 are repeated by their respective motors 16 and 17 to produce absolute motion representation.

Fig. 2 illustrates a second embodiment of the invention. The operation of this embodiment is substantially the same as that of the embodiment of Fig. 1, except that the arrangement is such that any one of an indefinite number of inputs may be utilized as a reference to which all other inputs may be related.

Referring to Fig. 2, there is illustrated a plurality of self-synchronous generators 26, 27, 28 and 29, the latter three of which are respectively connected to differential generators 30, 31 and 32 which, in turn, are respectively connected to self-synchronous motors 33, 34, 35. All of the units in each set thereof are connected as described in the embodiment of Fig. 1, except that instead of any one set of units being connected directly to a servo-system through a control transformer as in the embodiment of Fig. 1, each set is selectively connectible to a control-transformer 36 through the medium of a selector switch 37 movable between an "off" position, ABS, and a plurality of contacts which are respectively connected to the self-synchronous generators 26, 27, 28, 29. The output of the control transformer 36 is connected to a servo circuit comprising an amplifier 38 and servomotor 39 which operates suitable drive mechanism, indicated diagrammatically by the numerals 40, 41, 42 and 43, to move the respective rotors of the control transformer 36 and the differential generators 30, 31 and 32 to the same position as the rotor of that self-synchronous generator whose input is to be used as a reference. It will be observed that in the embodiment illustrated the self-synchronous generator 26 is not connected to a differential generator and motor and it is so shown to illustrate the fact that the position of the rotor of a single generator may be utilized as an independent reference to which other inputs may be related.

The operation of the device shown in Fig. 2 is as follows:

Assume that it is desired to relate the inputs to generators 27, 28 and 29, to the input of the generator 26. The selector switch 37 is moved to the contact designated in the drawing $\theta_0$ thereby electrically connecting the control transformer 37 and generator 26. The rotor of generator 26 is moved to a position $\theta_0$ which may represent any desired value such as the motion of a movable object. The control transformer 36 thereupon imparts a control voltage to the servo motor 39 causing it to move, by means of mechanism 40, 41, 42 and 43, the rotors of the control transformer 36 and the differential generators 30, 31 and 32 to an angular position $\theta_0$, whereupon the voltage output of the control transformer 36 becomes zero and all the aforesaid rotors come to rest in the angular position $\theta_0$. Now assume the rotors of self-synchronous generators 27, 28 and 29 are respectively turned to positions $\theta_1$, $\theta_2$, and $\theta_3$, representing motions of three separate objects. Under this condition the rotors of the self-synchronous motors 33, 34 and 35 turn to angular positions equal to the angular inputs to their respective self-synchronous generators less the angular input to the generator 26, that is to say, the angular output of motor 33 is equal to $\theta_1$ minus $\theta_0$; of motor 34, $\theta_2$ minus $\theta_0$; and so on for each set of self-synchronous units employed in the system.

If it is desired to use an input of any one of the other self-synchronous generators as the reference, the switch element is merely moved to the proper contact to electrically connect the selected reference self-synchronous system to the control transformer 36 thereby producing no motion of the rotor of that system's self-synchronous motor and rotor movement of all the other motors equal to the position of the rotor of their self-synchronous generators less the position of the chosen reference.

To produce an absolute representation at the motor outputs, all the rotors are positioned in their electrical zero position and switch 37 is turned to the "ABS" or "off" position to isolate the control transformer 36 and the servo circuit so that all inputs to the transmitters are repeated by their respective receivers without regard to other inputs.

If desired, self-synchronous generator 26 may be utilized as a zeroising unit by maintaining the rotor thereof in the electrical zero position. Thus when it is desired to change from a "relative" to an "absolute" representation the switch 37 is moved to the contact $\theta_0$ causing the servomotor 39 to move the rotors of the control-transformer 36 and the differential generators 30, 31 and 32 to their electrical zero positions.

It should be understood that this invention produces the intended results irrespective of whether the rotors of the self-synchronous generators are moved in either direction continuously and simultaneously or intermittently and with varying rates. Thus, where the operation of the invention has been described with a positioning of the rotors in specified angular positions it should be understood that this is for illustrative purposes only and that for any of the said angular positions it is intended that the same could be a variable angular rate of rotation. Furthermore, it should be clearly understood that our invention is not intended to be confined to the single speed data transmission system described but is equally applicable to well-known high-accuracy multispeed systems utilizing fine and coarse adjustment transmitters and receivers. For such use, it is merely necessary to provide in each speed circuit the components of our invention arranged as described herein.

It should be readily apparent to those skilled in the art that a data transmission system arranged as a value relating device in accordance with our invention need not be restricted to the use of self-synchronous units for accomplishing the same, but a wide variety of other analogous mechanical and electrical devices may be used. Hence, the invention as shown and described herein is illustrative of only two embodiments thereof and it should be understood that the same is not restricted thereto but is susceptible of being expressed in a variety of embodiments without departing from the scope and spirit of the appended claims.

What is claimed is:

1. A data transmission system for relating a plurality of variable input values to one thereof used as a reference, comprising a transmission system for each of said input values, said system including a transmitter, a differential, and a receiver, arranged in sets for each of said input values, and means for activating the differential of each set simultaneously and to the same degree as the transmitter of the variable input value used as a reference.

2. A system for producing values representing the relation of the values of a plurality of variable quantities to a variable reference value represented by the value of one of said quantities comprising a value generating device for each of said quantities, a differential connected to each of said generating devices for receiving the generated value thereof, means for imparting a second generated value into each of the said differentials whereby it generates a value equal to the first generated value minus the second generated value, a value receiving device connected to each of said differentials for indicating the resulting value generated thereby, and means for actuating the second generated value imparting means of the respective differentials simultaneously with and equal to the value of the reference quantity as generated by the value generating device thereof whereby the value indicated by the value receiving device thereof is zero and the values indicated by the respective value receiving devices of the other quantities is equal to the values thereof minus the value of the reference quantity.

3. A system as claimed in claim 2, wherein said last named means includes means for selectively actuating the second generated value imparting means of the respective differentials in accordance with the value generated by the value generating device of any one of the variable quantities selected as a reference.

4. A system as claimed in claim 2 wherein said last named means includes means for actuating said second generated value imparting means independently of values generated by the value generating devices of the variable quantities whereby the indicated values of the respective receiving devices are equal to the respective variable quantities minus the independent value generated by the second generated value imparting means of the differentials.

5. A system as claimed in claim 2 wherein said last named means includes means for actuating said second generated value imparting means so that the value thereof is equal to zero thereby enabling the value receiving devices of the respective variable quantities to indicate values equal to the values generated by their value generating devices.

6. A data transmission system for producing values representing the relation of the values of a plurality of variable quantities to a variable reference value represented by the value of one of said quantities comprising a self-synchronous generator for each of said quantities having stator windings and having rotor windings whose respective angular positions represent the value of each of said variable quantities, a differential generator having stator windings connected to the corresponding stator windings of each of said self-synchronous generators and having rotor windings whose angular positions represent the value of any other quantity, a self-synchronous motor for each of said differential generators having stator windings connected to the respective corresponding rotor windings of said differential generators and having rotor windings whose angular positions represent the difference between the angular positions of the rotors of the self-synchronous generator and the respective rotors of the differential generators, and means for connecting the rotors of the respective differential generators to the rotor of the self-synchronous generator whose rotor position represents the aforesaid reference value whereby all of the last named rotors are moved in unison to an angular position representing the value of said reference value.

7. The system as recited in claim 6 wherein said last named means includes means for selectively connecting any one of the rotors of the self-synchronous generators to the rotors of the differential generators.

8. The system as recited in claim 6 wherein said last named means comprises a control-transformer having rotor windings and having stator windings connected to the stator windings of the self-synchronous generator of the reference value, and a servomotor connected to the respective rotors of the transformer and differential generators and operated in response to the control voltage induced in the rotor windings of said transformer by the stator windings thereof to move all of the aforesaid rotors to the same angular position as the rotor of the reference value self-synchronous generator.

References Cited in the file of this patent

UNITED STATES PATENTS

| | | |
|---|---|---|
| 2,536,495 | Ewing | Jan. 2, 1951 |
| 2,598,250 | Gehman | May 27, 1952 |
| 2,619,733 | Horton et al. | Dec. 2, 1952 |

OTHER REFERENCES

"Servo Mechanism Fundamentals," Lauer, Lesnick, Matson, McGraw-Hill Book Co., 1947, pp. 37, 38.